United States Patent
Choi et al.

(10) Patent No.: US 10,063,831 B2
(45) Date of Patent: Aug. 28, 2018

(54) METHOD AND APPARATUS FOR STEREO IMAGE RECTIFICATION

(71) Applicant: Samsung Electronics Co., Ltd., Suwon-si, Gyeonggi-do (KR)

(72) Inventors: Ouk Choi, Yongin-si (KR); Hyunsuk Ko, Los Angeles, CA (US); C. C. Jay Kuo, Los Angeles, CA (US); Han Suk Shim, Los Angeles, CA (US)

(73) Assignees: Samsung Electronics Co., Ltd., Gyeonggi-Do (KR); University of Southern California, Los Angeles, CA (US)

( * ) Notice: Subject to any disclaimer, the term of this patent is extended or adjusted under 35 U.S.C. 154(b) by 200 days.

(21) Appl. No.: 15/015,447

(22) Filed: Feb. 4, 2016

(65) Prior Publication Data

US 2016/0234473 A1    Aug. 11, 2016

(30) Foreign Application Priority Data

Feb. 9, 2015 (KR) .................. 10-2015-0019350
Dec. 8, 2015 (KR) .................. 10-2015-0174179

(51) Int. Cl.
G06K 9/00    (2006.01)
H04N 13/00   (2018.01)
H04N 13/02   (2006.01)
G06T 7/80    (2017.01)

(52) U.S. Cl.
CPC .......... *H04N 13/0018* (2013.01); *G06T 7/85* (2017.01); *H04N 13/025* (2013.01); *H04N 13/0239* (2013.01); *H04N 13/0246* (2013.01); *H04N 2013/0081* (2013.01)

(58) Field of Classification Search
None
See application file for complete search history.

(56) References Cited

U.S. PATENT DOCUMENTS

2014/0210810 A1    7/2014    Davidson et al.
2016/0150211 A1    5/2016    Hwang et al.

FOREIGN PATENT DOCUMENTS

JP    2003052057 A    2/2003
KR    100853201 B1    8/2008
KR    20120020306 A    3/2012

(Continued)

OTHER PUBLICATIONS

Wu, Hsien-Huang P., and Yu-Hua Yu. "Projective rectification with reduced geometric distortion for stereo vision and stereoscopic video." Journal of Intelligent and Robotic Systems 42.1 (2005): 71-94.*

(Continued)

*Primary Examiner* — Manav Seth
*Assistant Examiner* — David Perlman
(74) *Attorney, Agent, or Firm* — Harness, Dickey & Pierce, P.L.C.

(57) ABSTRACT

A method for stereo image rectification includes receiving a plurality of images and determining a matrix for performing rectification on the plurality of images based on a first cost function and a second cost function. The first cost function may be associated with a distance of a corresponding pair of points from among the plurality of images. The second cost function may be associated with distortion in a converted image.

27 Claims, 12 Drawing Sheets

(56) References Cited

FOREIGN PATENT DOCUMENTS

KR    20140001358 A    1/2014
KR    20140032283 A    3/2014

OTHER PUBLICATIONS

Fathy, Mohammed E., Ashraf S. Hussein, and Mohammed F. Tolba. "Fundamental matrix estimation: A study of error criteria." Pattern Recognition Letters 32.2 (2011): 383-391.*

Andrea Fusiello et al. "Quasi-Euclidean Epipolar Rectification of Uncalibrated Images". Pattern Recognition, ICPR—19th International Conference. 2008. pp. 1-29.

* cited by examiner

METHOD AND APPARATUS FOR STEREO IMAGE RECTIFICATION

CROSS-REFERENCE TO RELATED APPLICATION

This application claims the priority benefit of Korean Patent Application No. 10-2015-0019350, filed on Feb. 9, 2015, in the Korean Intellectual Property Office, and Korean Patent Application No. 10-2015-0174179, filed on Dec. 8, 2015, in the Korean Intellectual Property Office, the entire contents of each of which are incorporated herein by reference in their entirety.

BACKGROUND

1. Field

At least one example embodiment relates to a method for stereo image rectification.

2. Description of the Related Art

A stereo image may be used in various fields. The stereo image may include left and right images. The left and right images should be aligned for an appropriate stereo effect. For example, each of corresponding pairs of left and right images should be disposed on an identical horizontal line. Accordingly, rectification may be desired for the left and right images.

SUMMARY

At least one example embodiment relates to an image rectification method.

In some example embodiments, the method may include receiving a plurality of images, and determining a matrix for performing rectification on the images based on a first cost function associated with a distance of a corresponding pair among the images and a second cost function associated with a distortion in a converted image. The images may include a stereo image.

The second cost function may include at least one of a first distortion component with respect to an aspect ratio of a converted image, a second distortion component with respect to a skewness of a converted image, a third distortion component with respect to a rotation of a converted image in comparison to an original image, and a fourth distortion component with respect to a size ratio of a converted image in comparison to an original image.

The first cost function may include a sum of Sampson distances of corresponding pairs among the images.

The determining may include determining values of parameters included in the matrix in order to minimize a sum of the first cost function and the second cost function.

The parameters may include a first focal length of a first camera photographing a first image among the images, a second focal length of a second camera photographing a second image among the images, a first separation distance of the first camera, a second separation distance of the second camera, first rotation angles of the first camera, and second rotation angles of the second camera.

The matrix may include a first conversion matrix to convert a first image among the images, and a second conversion matrix to convert a second image among the images.

Each of the first conversion matrix and the second conversion matrix may include a first camera matrix with respect to a focal point of a camera photographing a corresponding image, a second camera matrix with respect to a separation of a camera photographing a corresponding image, and a third camera matrix with respect to a rotation of a camera photographing a corresponding image.

The image rectification method may further include extracting feature points from the images, and extracting the corresponding pairs among the images by matching the feature points among the images.

The image rectification method may further include calculating a homography matrix among the images based on the corresponding pairs among the images, and determining a weight of the second cost function based on the homography matrix.

The determining of the weight may include at least one of determining a weight of a distortion component indicating a skewness included in the second cost function based on a skewness component of the homography matrix, determining a weight of a distortion component indicating a rotation included in the second cost function based on a rotation component of the homography matrix, and determining a weight of a distortion component indicating a scale included in the second cost function based on a scale component of the homography matrix.

The image rectification method may further include converting the plurality of images based on the matrix, and performing stereo matching based on the converted images.

At least one example embodiment relates to an image rectification apparatus.

In some example embodiments, the apparatus may include a receiver configured to receive a plurality of images, and a determiner configured to determine a matrix for performing rectification on the images based on a first cost function associated with a distance of a corresponding pair among the images and a second cost function associated with a distortion in a converted image.

At least one example embodiment relates to an image processing method.

In some example embodiments, the method may include obtaining stereo images, extracting feature points from the stereo images, extracting corresponding pairs by matching feature points of a left image and feature points of a right image, and determining a fundamental matrix of the stereo images based on a first cost function and a second cost function, the first cost function being associated with a distance of a corresponding pair, the second cost function being associated with a distortion in a converted image.

The image processing method may further include calculating a homography matrix among the stereo images based on the corresponding pairs, and determining a weight of at least one distortion component included in the second cost function based on the homography matrix.

The determining of the weight may include at least one of determining a weight of a distortion component indicating a skewness included in the second cost function based on a skewness component of the homography matrix, determining a weight of a distortion component indicating a rotation included in the second cost function based on a rotation component of the homography matrix, and determining a weight of a distortion component indicating a scale included in the second cost function based on a scale component of the homography matrix.

The distortion component indicating the skewness may include at least one of a first distortion component indicating an aspect ratio of a converted image, and a second distortion component indicating a skewness of a converted image. The distortion component indicating the rotation may include a third distortion component indicating a rotation of a converted image in comparison to an original image. The distortion component indicating the scale may include a fourth distortion component indicating a size of a converted image in comparison to an original image.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1A:
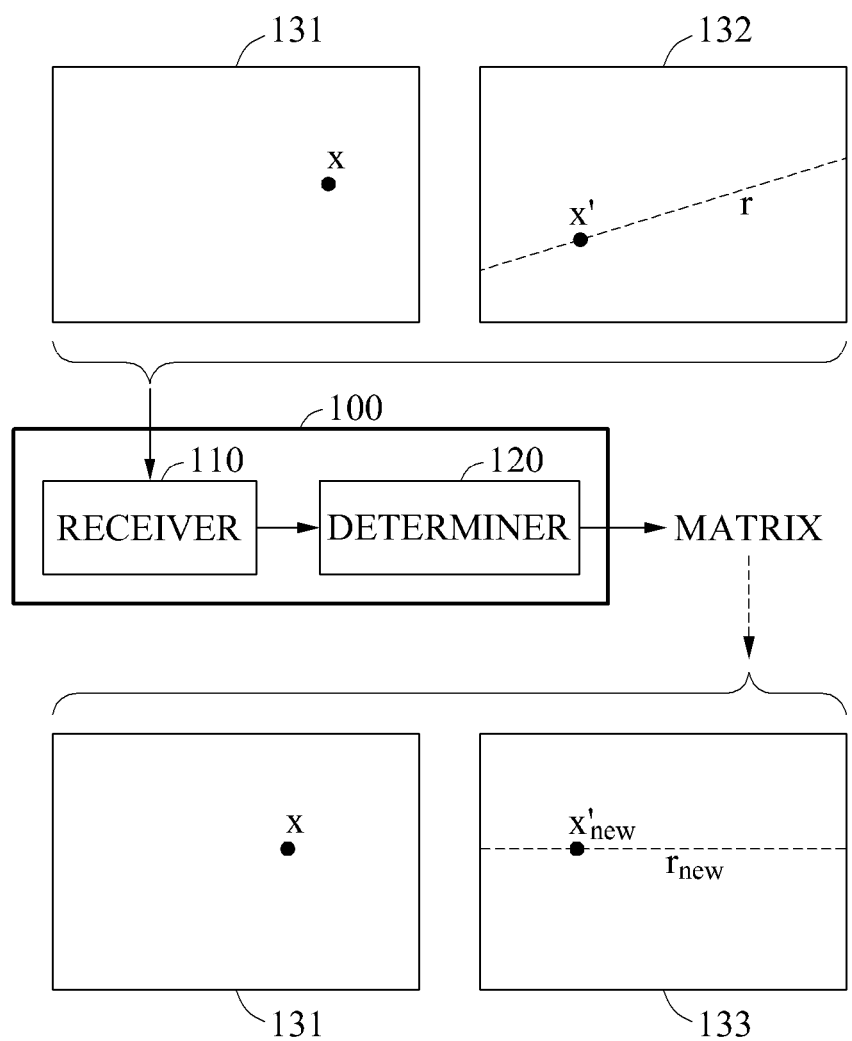
FIG. 1A illustrates an example of an image rectification apparatus according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Exemplary embodiments to be described hereinafter may be applicable to process a stereo image and used for various devices and apparatuses such as personal computers, laptop computers, tablet computers, smartphones, televisions, smart appliances, intelligent vehicles, kiosks, and wearable devices.

FIG. 1A illustrates an example of an image rectification apparatus according to at least one example embodiment. Referring to FIG. 1, an image rectification apparatus 100 according to example embodiments includes a receiver 110 and a determiner 120. The image rectification apparatus 100 may be implemented with a processor (e.g., a special purpose processor), such as the processor 1110 illustrated in FIG. 11.

The receiver receives a plurality of images 131 and 132. The plurality of images 131 and 132 may include a stereo image. The stereo image corresponds to an image photographed from a plurality of viewpoints. The stereo image may include a left image photographed from a left viewpoint and a right image photographed from a right viewpoint.

The stereo image includes corresponding pairs. For example, when an identical object is photographed from different viewpoints, positions of points indicating the object in images from each viewpoint may vary due to a disparity. Two images may be compared in order to extract the corresponding pairs from the stereo image. A method of extracting corresponding pairs from a stereo image may be referred to as stereo matching.

To reduce complexity of the stereo matching, two images may be compared under the assumption that although vertical locations of two points included in corresponding pairs are identical, horizontal locations are different. For example, left and right cameras photographing a stereo image are horizontally spaced apart and vertically disposed at an identical height. In this example, the stereo matching may be performed under the assumption that the corresponding pairs of left and right images are present at an identical vertical position to extract the corresponding pairs from the stereo image.

However, the left and the right cameras photographing the stereo image may not be perfectly aligned due to various reasons. For example, heights of the left and right cameras may slightly differ due to a manufacturing process, and orientations of the left camera or the right camera may be changed during use. In this example, accuracy of the stereo matching may be reduced under the assumption that the corresponding pairs of the left and right images are present at an identical vertical position.

The image rectification apparatus 100 according to at least one example embodiment may rectify each stereo image in order for all corresponding pairs of stereo images to be disposed at an identical vertical position. Hereinafter, a stereo rectification may be referred to as performing rectification on each stereo image in order for all corresponding pairs of stereo images to be disposed at an identical vertical position.

Referring to FIG. 1A, the plurality of images 131 and 132 may be referred to as an image from a first viewpoint 131 and an image from a second viewpoint 132. For example, the image from the first viewpoint 131 may correspond to a left image and the image from the second viewpoint 132 may correspond to a right image. The image 131 may include a point x and the image 132 may include a point x'. The point x and the point x' may be a corresponding pair (or corresponding pair of points). For ease of description, the point x and the point x' are illustrated and referred to as a corresponding pair. However, corresponding pairs in addition to the point x and the point x' may be present in the images 131 and 132.

Figure 1B:
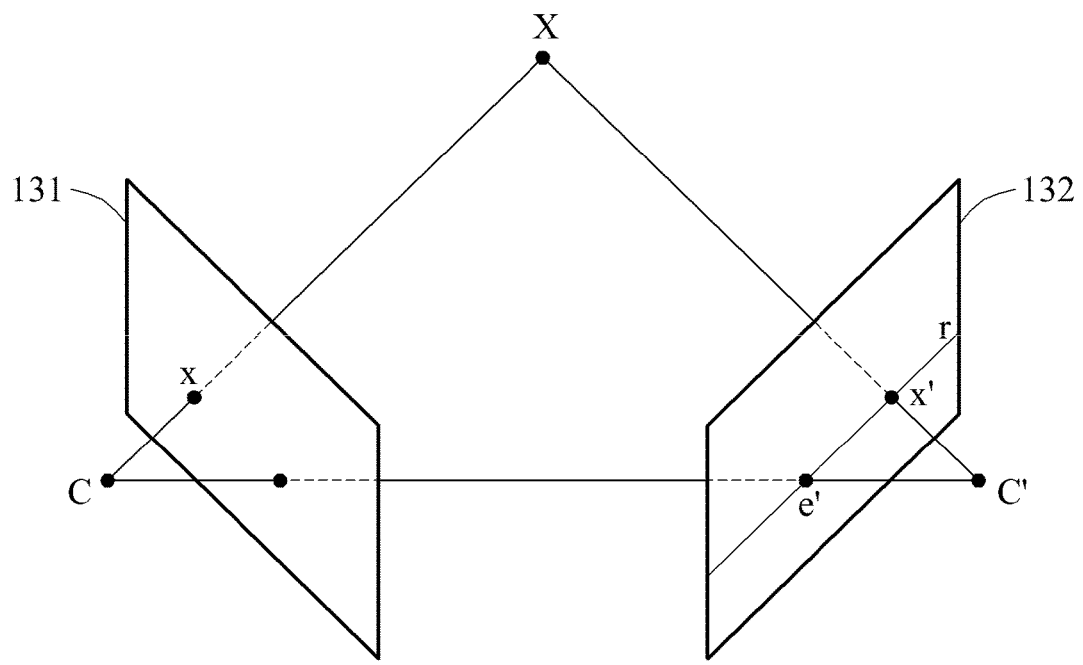
FIG. 1B illustrates an epipolar line according to at least one example embodiment.

Among points included in the image 132, points corresponding to the point x included in the image 131 may be illustrated as an epipolar line r. Referring to FIG. 1B, a point X in a three-dimensional (3D) space is projected to a camera center C of a first viewpoint and expressed as the point x included in the image 131. Also, the point X in the 3D space is projected to a camera center C' of a second viewpoint and expressed as the point x' included in the image 132. In such a case, since the point x and the point x' are results of which the identical point X in the 3D space is projected to camera centers of each viewpoints, the point x and the point x' become corresponding pairs.

A plane including the camera center C of the first viewpoint, the camera center C' of the second viewpoint, and the point X in the 3D space is an epipolar plane. A straight line connecting the camera center C of the first viewpoint and the camera center C' of the second viewpoint is a baseline. A straight line connecting the point x' and a point e' at which the baseline meets the image 132 refers to the epipolar line r. The epipolar line r refers to a line on which the epipolar plane meets the image 132.

Referring back to FIG. 1A, the plurality of images 131 and 132 are previous images to which a stereo rectification is applied, and a vertical position of points on the epipolar line r of the point x may be different from a vertical position of the point x. The image rectification apparatus 100 may rectify, through the stereo rectification, the image 132 so that the vertical position of the points on the epipolar line r is identical to the vertical position of the point x. For example, the image 132 may be rectified to the image 133 based on the stereo rectification. Referring to the image 131 and the image 133, the vertical position of the point x and a vertical position of points on an epipolar line $r_{new}$ are identical.

To rectify the image 132 so that the vertical position of the points on the epipolar line r is identical to the vertical position of the point x, the epipolar line r corresponding to the point x may be obtained. For example, when the epipolar line r is obtained, the image 132 may be rectified based on rectification in which a gradient of the epipolar line r becomes "0." To obtain the epipolar line r, the determiner 120 may determine a matrix for performing stereo rectification on the plurality of images 131 and 132. Hereinafter, descriptions related to operation of the determiner 120 will be provided.

Although an example embodiment in which the stereo rectification is applied to the image 132 is described above for ease of description, the stereo rectification may be also applied to the image 131. For example, the image rectification apparatus 100 may obtain an epipolar line r' corresponding to the point x' included in the image 131 and rectify the image 131 so that that the vertical position of points on the epipolar line r' are identical to the vertical position of the point x'.

Although the stereo image is described to be provided in a left image and a right image for ease of description, relative positions among a plurality of images may be diversely changed based on a disposition and a viewpoint of a camera photographing a stereo image. For example, when a camera photographing a stereo image is vertically not horizontally disposed, the stereo image may include an upper image photographed from an upper viewpoint and a lower image photographed from a lower viewpoint. In this example, images may be rectified so that vertical positions of corresponding pairs are identical.

The image rectification apparatus 100 may provide technology for reducing (or alternatively, minimizing) a distortion generated in a rectification process of stereo images. Hereinafter, the stereo rectification process will be described in detail.

<Determination of a Fundamental Matrix>

The determiner 120 may determine a matrix for performing stereo rectification on the plurality of images 131 and 132. The matrix for performing the stereo rectification on images may be a fundamental matrix. Between the point x and the epipolar line r, a fundamental matrix F may have a relationship as shown in Equation 1.

$$\begin{pmatrix} a \\ b \\ c \end{pmatrix} = F \begin{pmatrix} x \\ y \\ 1 \end{pmatrix} \quad \text{[Equation 1]}$$

In Equation 1, the fundamental matrix F may be a matrix in a size of 3×3. $(x, y, 1)^T$ denotes the point x, and $(a, b, c)^T$ denotes the epipolar line r. Based on Equation 1, the point x may be converted to the epipolar line r by the fundamental matrix F.

A relationship between the epipolar line r and the point x' may be expressed by Equation 2, and Equation 3 may be obtained from Equations 1 and 2.

$$(x', y', 1)\begin{pmatrix} a \\ b \\ c \end{pmatrix} = 0 \quad \text{[Equation 2]}$$

$$(x', y', 1)F\begin{pmatrix} x \\ y \\ 1 \end{pmatrix} = 0 \quad \text{[Equation 3]}$$

When $H_l$ denotes a conversion to stereo rectify a left image and $H_r$ denotes a conversion to stereo rectify a right image, $H_l$ and $H_r$ are expressed as shown in Equations 4 and 5.

$$\begin{pmatrix} x_{new} \\ y_{new} \\ 1 \end{pmatrix} \propto H_l \begin{pmatrix} x \\ y \\ 1 \end{pmatrix} \quad \text{[Equation 4]}$$

$$\begin{pmatrix} x'_{new} \\ y'_{new} \\ 1 \end{pmatrix} \propto H_r \begin{pmatrix} x' \\ y' \\ 1 \end{pmatrix} \quad \text{[Equation 5]}$$

Since heights of corresponding pairs of a stereo rectified image are identical, a relationship $y_{new} = y'_{new}$ may be expressed as shown in Equation 6.

$$(x'_{new}, y'_{new}, 1)F_{new}\begin{pmatrix} x_{new} \\ y_{new} \\ 1 \end{pmatrix} = 0, \quad \text{[Equation 6]}$$

$$F_{new} = \begin{pmatrix} 0 & 0 & 0 \\ 0 & 0 & -1 \\ 0 & 1 & 0 \end{pmatrix}$$

In Equations 4 through 6, new denotes a coordinate of a rectified image. Equation 7 may be obtained from Equations 3 through 6.

$$F = H_r^{-T} F_{new} H_l \quad \text{[Equation 7]}$$

Based on Equation 7, the fundamental matrix F may be determined based on $H_l$ and $H_r$. The determiner 120 may determine the fundamental matrix F by determining $H_l$ and $H_r$. $H_l$ and $H_r$ may be parameterized by various parameters. Parameters for the fundamental matrix F will be described in detail with reference to FIGS. 2A and 2B.

<Parameters of a Fundamental Matrix>

Figure 2A:
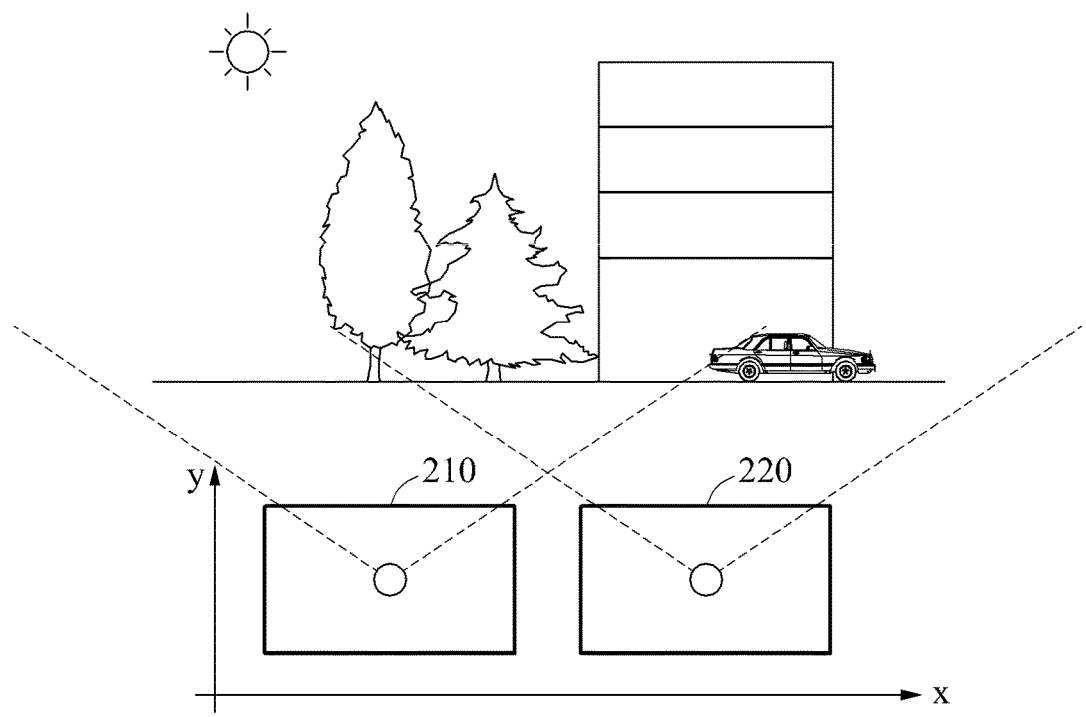
FIG. 2A illustrates a process in which an image is obtained through a stereo camera according to at least one example embodiment.

FIG. 2A illustrates a process in which an image is obtained through a stereo camera according to at least one example embodiment. Referring to FIG. 2A, stereo cameras 210 and 220 may be referred to as a camera from a first viewpoint 210 and a camera from a second viewpoint 220. The cameras 210 and 220 are horizontally disposed. A y-coordinate of a viewpoint of the camera 210 and a y-coordinate of a viewpoint of the camera 220 may be identical. Although the process through which the stereo image is obtained will be described based on the stereo cameras 210 and 220 being horizontally disposed, the stereo cameras 210 and 220 may also be vertically disposed. When the stereo cameras 210 and 220 are vertically disposed, an x-coordinate of the viewpoint of the camera 210 and an x-coordinate of the viewpoint of the camera 220 may be identical.

The cameras 210 and 220 have different viewpoints. When the cameras 210 and 220 photograph an identical object, coordinates of an object in the image photographed by the camera 210 may be different from coordinates of an object in the image photographed by the camera 220. For example, the image 131 in FIG. 1B may be an image photographed by the camera 210 and the image 132 in FIG. 1B may be an image photographed by the camera 220.

When the cameras 210 and 220 are disposed in parallel, unaligned stereo images may be obtained due to various factors. For example, the various factors may include focal lengths of the cameras 210 and 220, separation distances of the cameras 210 and 220, rotations of the cameras 210 and 220, and the like. The image rectification apparatus 100 may perform stereo rectification with respect to the obtained images based on the various factors.

Figure 2B:
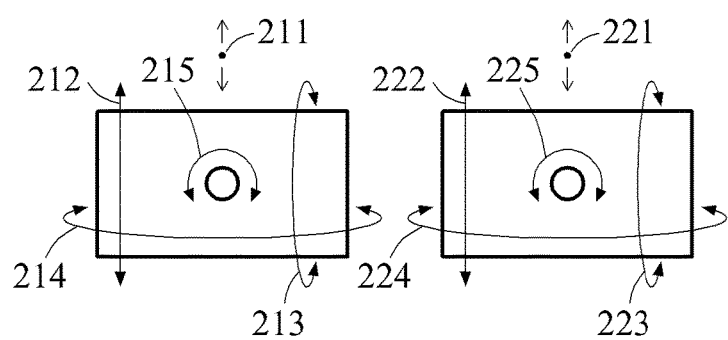
FIG. 2B illustrates examples of parameters for performing rectification on an obtained image according to at least one example embodiment.

FIG. 2B illustrates examples of parameters for performing rectification on an obtained image according to at least one example embodiment. Referring to FIG. 2B, parameters of the cameras 210 and 220 in FIG. 2A are illustrated. The parameter of the camera 210 includes a focal length (or focal point) 211, a separation distance 212, and rotation angles 213, 214, and 215. The parameter of the camera 220 includes a focal length (or focal point) 221, a separation distance 222, and rotation angles 223, 224, and 225.

The focal lengths 211 and 221 may be generally defined. For example, the focal lengths 211 and 221 may indicate distances from lenses to image sensors of the cameras 210 and 220. The separation distance 222 may indicate a distance from each of the cameras 210 and 220 vertically or horizontally spaced apart from a designed position. When the cameras 210 and 220 are horizontally disposed, the separation distances 212 and 222 may indicate distances from the cameras 210 and 220 vertically spaced apart from each other. When the cameras 210 and 220 are vertically disposed, the separation distances 212 and 222 may indicate distances from the cameras 210 and 220 horizontally spaced apart from each other. Rotation angles 213, 214, 215, 223, 224, and 225 may indicate degrees of rotation in directions as illustrated in FIG. 2B.

Referring back to FIG. 1, the determiner 120 may parameterize $H_l$ and $H_r$ based on at least one portion of the parameters described above in FIG. 2B.

According to example embodiments, the determiner 120 may parameterize $H_l$ and $H_r$ based on a focal length, a separation distance, and/or a rotation angle of a camera. In this example, $H_l$ and $H_r$ may be expressed as shown in Equations 8 and 9 based on the focal length (or focal point), the separation distance, and the rotation angle of the camera.

$$H_l = K_{nl} T_l R_l K_{ol}^{-1} \quad \text{[Equation 8]}$$

$$H_r = K_{nr} T_r R_r K_{or}^{-1} \quad \text{[Equation 9]}$$

Here, $K_{ol}$, $K_{or}$, $K_{nl}$, and $K_{nr}$ denote camera matrices with respect to (or associated with) the focal length of the camera. $K_{ol}$, $K_{or}$, $K_{nl}$, and $K_{nr}$ denote camera matrices of a pre-rectified left image, a pre-rectified right image, a rectified left image and a rectified right image, respectively. $K_{ol}$ and $K_{or}$ may be expressed as shown in Equations 10 and 11, respectively.

$$K_{ol} = \begin{pmatrix} \alpha_l & 0 & w/2 \\ 0 & \alpha_l & h/2 \\ 0 & 0 & 1 \end{pmatrix} \quad \text{[Equation 10]}$$

$$K_{or} = \begin{pmatrix} \alpha_r & 0 & w/2 \\ 0 & \alpha_r & h/2 \\ 0 & 0 & 1 \end{pmatrix} \quad \text{[Equation 11]}$$

Here, $\alpha_l$ denotes a focal length of a left camera, $\alpha_r$ denotes a focal length of a right camera. w denotes a width of a pre-rectified image and h denotes a height of a pre-rectified image. $K_{nl}$ and $K_{nr}$ may be set as Equation 12 so that the focal lengths of the left and right cameras are identical in the rectified stereo image.

$$K_{nl} = K_{nr} = K_{ol} \quad \text{[Equation 12]}$$

In Equations 8 and 9, $R_l$ and $R_r$ denote camera matrices with respect to rotations of cameras. $R_l$ and $R_r$ denote camera matrices of pre-rectified left and right images, respectively. For a description of the focal length and the rotation angle, reference may be made to the descriptions provided in FIG. 2B.

In Equations 8 and 9, $T_l$ and $T_r$ denote camera matrices with respect to focal lengths of cameras. $T_l$ and $T_r$ may be expressed as shown in Equations 13 and 14.

$$T_l = \begin{pmatrix} 1 & 0 & 0 \\ 0 & 1 & t_{yl} \\ 0 & 0 & 1 \end{pmatrix} \quad \text{[Equation 13]}$$

$$T_r = \begin{pmatrix} 1 & 0 & 0 \\ 0 & 1 & t_{yr} \\ 0 & 0 & 1 \end{pmatrix} \quad \text{[Equation 14]}$$

Here, $t_{yl}$ denotes a separation distance in a vertical direction of the left camera, and $t_{yr}$ denotes a separation distance in a vertical direction of the right camera. When the camera photographing a stereo image is provided in upper and lower cameras, a separation distance in a horizontal direction of the upper camera and a separation distance in a horizontal direction of the lower camera may be used as parameters.

The determiner 120 may determine the fundamental matrix F by adjusting values of parameters described above.

<A Cost Function>

The determiner 120 may determine the fundamental matrix F based on a cost function. The cost function may correspond to a function for estimating a rectification performance of the fundamental matrix F determined based on the parameters. The cost function may be diversely defined based on an estimation basis of the rectification performance. The determiner 120 may determine values of the parameters of the fundamental matrix F in order to minimize an output of the cost function.

The cost function may include a first cost function associated with a distance of a corresponding pair of points. The first cost function may estimate the rectification performance of the fundamental matrix F based on a Sampson distance. The first cost function may be expressed as shown in Equation 15.

$$E_S = \sum_j E_j^2 \qquad \text{[Equation 15]}$$

Here, $E_s$ denotes the first cost function, j denotes indexes of the corresponding pairs, and $E_j$ denotes the Sampson distance of a $j^{th}$ corresponding pair. According to Equation 15, $E_s$ may be calculated as a sum of Sampson distances of the corresponding pairs. The Sampson distance may be determined based on a distance between a corresponding point of a desired (or alternatively, predetermined) point and an epipolar line of the point. For example, a Sampson distance may increase according to increases of a distance between the point $x_j'$ in a left image and the epipolar line $r_j$, and a distance between the point $x_j$ in a right image and the epipolar line $r_j'$. Example embodiments may determine the fundamental matrix F to obtain epipolar lines of points included in an image by determining the parameters in order to minimize an output of the first cost function.

To calculate the first cost function, the determiner 120 may use a desired (or alternatively, predetermined) number of corresponding pairs. The desired (or alternatively, predetermined) number may be a minimum number used for calculating the first cost function. As will be described in detail with reference to FIG. 5, the desired (or alternatively, predetermined) number of the corresponding pairs may be extracted prior to performing the stereo matching. For example, the feature points may be extracted from a stereo image. The desired (or alternatively, predetermined) number of the corresponding pairs may be extracted based on an operation of matching the feature points extracted from the left image to the feature points extracted from the right image.

The cost function may include a second cost function associated with a distortion of a converted image. The second cost function may include components for estimating a distortion degree of a rectified image. For example, the second cost function may include at least one of a first distortion component with respect to (or indicating) an aspect ratio of a converted (or rectified) image, a second distortion component with respect to a skewness of a converted (or rectified) image, a third distortion component with respect to a rotation of a converted (or rectified) image in comparison to an original image, and a fourth distortion component with respect to a size ratio of a converted (or rectified) image in comparison to an original image.

Example embodiments may determine the fundamental matrix F in order to reduce (or alternatively, minimize) a distortion that occurs due to a stereo rectification by determining parameters in order to minimize a sum of the output of the first cost function and the output of the second cost function. The second cost function will be described in detail with reference to FIG. 3.

Figure 3:
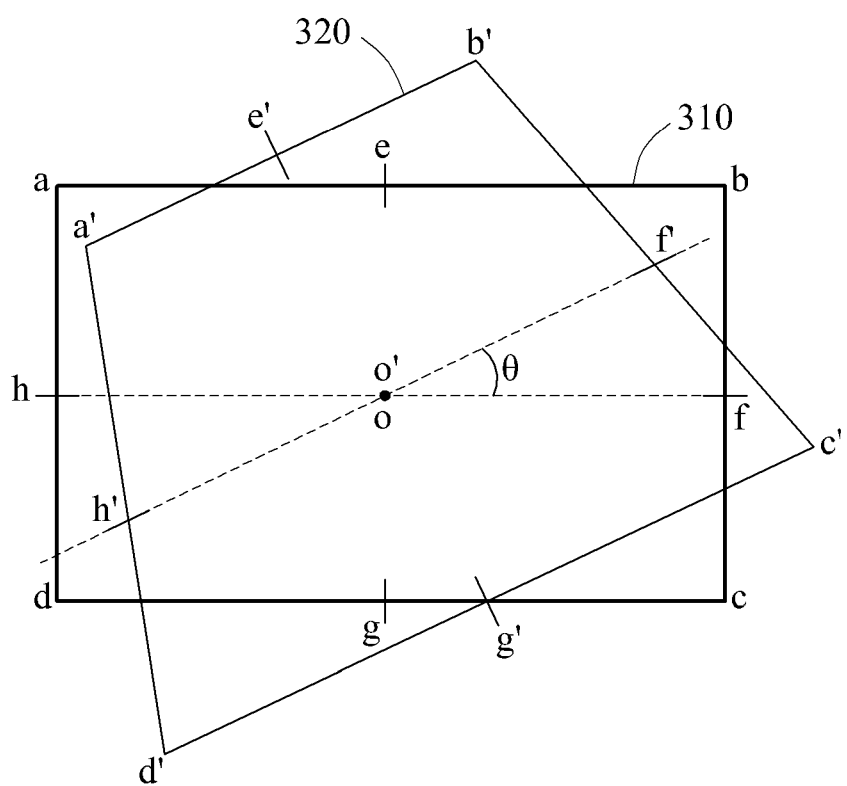
FIG. 3 illustrates an example of parameters for determining a distortion degree of a rectified image according to at least one example embodiment.

FIG. 3 illustrates an example of parameters for determining a distortion degree of a rectified image according to at least one example embodiment. Referring to FIG. 3, a pre-rectified image 310 and a rectified image 320 are illustrated. The pre-rectified image 310 includes edges a, b, c, and d, centers of sides e, f, g, and h, and a center o of the pre-rectified image 310. The rectified image 320 includes edges a', b', c', and d', centers of sides e', f', g', and h', and a center o' of the rectified image 320.

A first distortion component with respect to an aspect ratio of a converted image may be determined by Equation 16.

$$E_{AR} = \frac{1}{2}\left(\frac{\overline{a'o'}}{\overline{c'o'}} + \frac{\overline{b'o'}}{\overline{d'o'}}\right) \qquad \text{[Equation 16]}$$

Here, $E_{AR}$ denotes the first distortion component. The more similar the distances from the center o' to the edges a', b', c', and d', the closer $E_{AR}$ is to "1." Concisely, an ideal value of $E_{AR}$ in which a distortion is not generated in the rectified image 320 may be "1." Accordingly, the distortion in the rectified image 320 may be determined to be relatively small the closer an $E_{AR}$ value is to "1."

A second distortion component with respect to a skewness of a converted image may be determined by Equation 17.

$$E_{Sk} = \frac{1}{4}\sum_{i=1}^{4}(|90° - \angle CA_i|) \qquad \text{[Equation 17]}$$

Here, $E_{SK}$ denotes the second distortion component, and $\angle CA_i$ denotes an angle of an $i^{th}$ edge in the rectified image 320. The smaller $E_{sk}$, the closer internal angles of the edges a', b', c', and d' to 90°. Accordingly, an ideal value of $E_{sk}$ is "0", and the distortion in the rectified image 320 may be determined to be relatively small when $E_{sk}$ is closer to "0."

A third distortion component with respect to a rotation of a converted image in comparison to an original image may be determined by Equation 18. The third distortion component may be calculated using an inner product of a vector as shown in Equation 18. Equation 18 indicates an example embodiment with respect to a center f of a side and a center f' of a side. However, the third distortion component may be also determined based on the centers e, g, and h of the sides and the centers e', g', and h' of the sides.

$$E_R = \cos^{-1}\left(\frac{\overline{of}\cdot\overline{o'f'}}{|\overline{of}||\overline{o'f'}|}\right) \qquad \text{[Equation 18]}$$

Here, $E_r$ denotes the third distortion component. An ideal value of $E_r$ may be "1." The closer an $E_r$ value is to "1", the distortion in the rectified image 320 may be determined to be relatively small.

A fourth distortion component with respect to a size ratio of a converted image in comparison to an original image may be determined by Equation 19.

$$E_{SR} = \frac{Area_{rec}}{Area_{orig}} \qquad \text{[Equation 19]}$$

Here, $E_s$ denotes the fourth distortion component. $Area_{rec}$ denotes an area of the rectified image 320 and $Area_{orig}$ denotes an area of the pre-rectified image 310. The ideal value of $E_s$ may be "1", and the closer an $E_s$ value is to "1", the distortion in the rectified image 320 may be determined to be relatively small.

A function that decreases when the first distortion component is closer to an ideal value may be defined as $f_{AR}(E_{AR})$, a function that decreases when the second distortion component is closer to an ideal value may be defined as $f_{Sk}(E_{Sk})$, a function that decreases when the third distortion component is closer to an ideal value may be defined as $f_R(E_R)$, and a function that decreases when the fourth distortion component is closer to an ideal value may be defined as $f_{SR}(E_{SR})$. The second cost function may be determined based on the aforementioned functions.

Referring back to FIG. 1, the determiner 120 may determine the fundamental matrix F based on the first cost function and the second cost function described above. For example, the determiner 120 may determine the values of the parameters of the fundamental matrix F in order to minimize the sum of the first cost function and the second cost function. Equation 20 indicates an example with respect to the sum of the first cost function and the second cost function. The determiner 120 may determine the fundamental matrix F using Equation 20.

$$C(\phi) = E_s + \rho_{AR}f_{AR}(E_{AR}) + \rho_{Sk}f_{Sk}(E_{Sk}) + \rho_R f_R(E_R) + \rho_{SR}f_{SR}(E_{SR}) \qquad \text{[Equation 20]}$$

Here, C denotes a total cost function with respect to the sum of the first cost function and the second cost function, $\varphi$ denotes the parameters of the fundamental matrix F, $E_s$ denotes the first cost function, and $f_{AR}(E_{AR})$, $f_{Sk}(E_{Sk})$, $f_R(E_R)$, and $f_{SR}(E_{SR})$ denote functions associated with a first distortion component, a second distortion component, a third distortion component, and a fourth distortion component, respectively. $\rho_{AR}$, $\rho_{Sk}$, $\rho_R$, and $\rho_{SR}$ denote weights of $f_{AR}(E_{AR})$, $f_{Sk}(E_{Sk})$, $f_R(E_R)$, and $f_{SR}(E_{SR})$, respectively. The determiner 120 may determine $\varphi$ in order to minimize $C(\phi)$.

The image rectification apparatus 100 may further include a converter. The converter may convert the plurality of images 131 and 132 based on the determined fundamental matrix F. For example, the converter may obtain the epipolar line r corresponding to the point x using the fundamental matrix F, and convert the image 132 to the image 133 based on the rectification in which the gradient of the epipolar line r become "0."

The image rectification apparatus 100 may further include a matcher. The matcher may perform stereo matching based on images converted by the converter.

Figure 4:
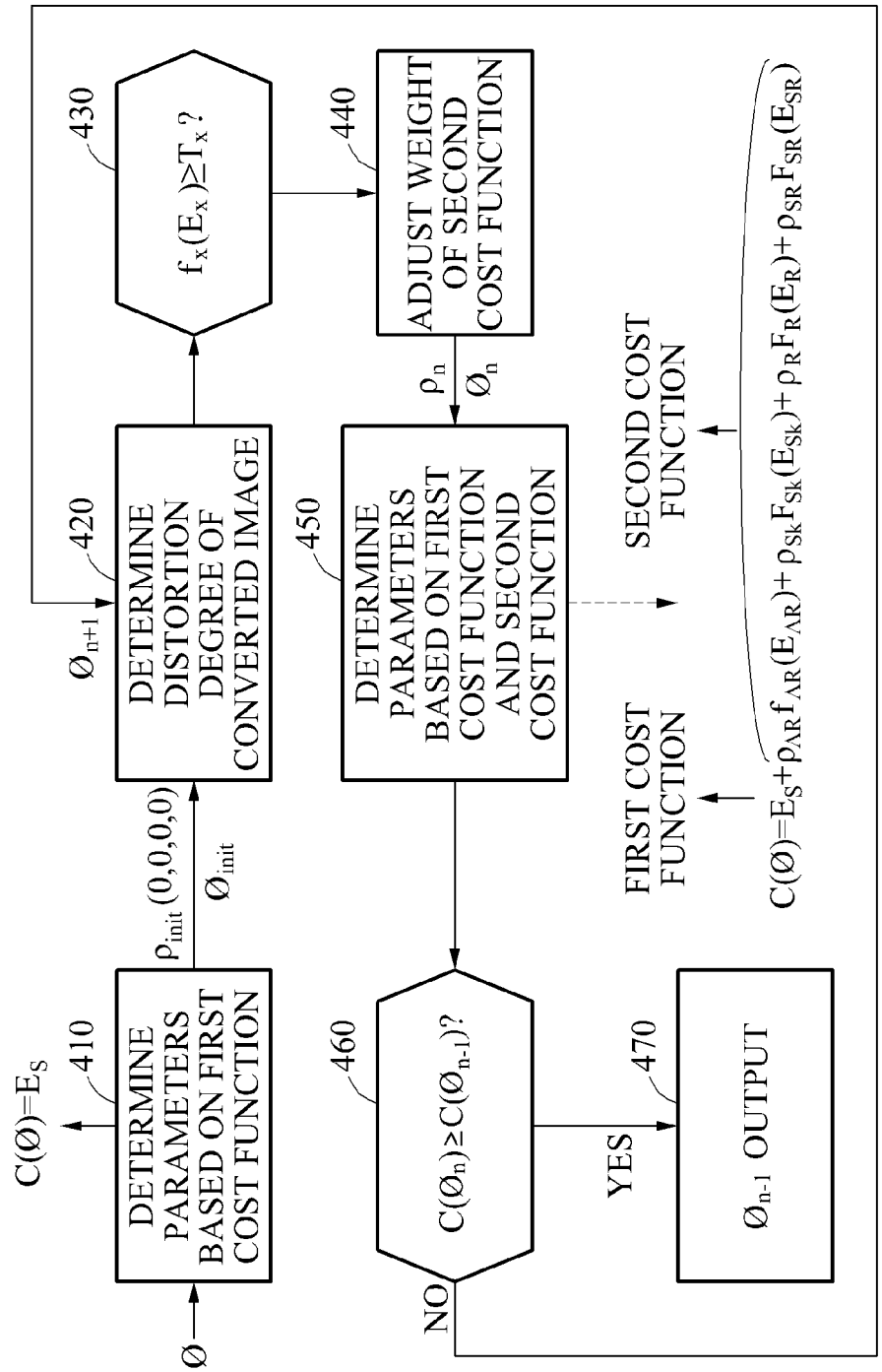
FIG. 4 illustrates an example of obtaining parameters for determining a matrix using a first cost function and a second cost function according to at least one example embodiment.

FIG. 4 illustrates an example of obtaining parameters for determining a matrix using a first cost function and a second cost function according to at least one example embodiment.

Referring to FIG. 4, in operation 410, an image rectification apparatus (e.g., image rectification apparatus 100) may determine parameters (e.g., using determiner 120) based on a first cost function. The image rectification apparatus may output parameters $\varphi_{init}$ that minimize a cost function $E_s$ among input parameters $\varphi$. In operation 410, $\varphi$ denotes input parameters, $E_s$ denotes the total cost function, and $C(\varphi)$ denotes a value of the first cost function by the input parameters $\varphi$.

In operation 420, the image rectification apparatus may determine a distortion degree of a converted image (i.e., an image that has been rectified using the first cost function). In operation 420, $\rho_{init}$ denotes an initial weight with respect to distortion components. For example, $\rho_{init}$ 0, 0, 0, 0 indicates that all initial weights of a first distortion component through a fourth distortion component are "0." The foregoing descriptions are also applicable to the first distortion component through the fourth distortion component. The image rectification apparatus may determine the distortion degree of the converted image based on the distortion components. The distortion degree of the converted image may be expressed as E.

In operation 430, the image rectification apparatus may compare the distortion degree of the converted image to a desired (or alternatively, predetermined) threshold value. In operation 430, $f_x$ denotes a function that determines the distortion degree and $T_x$ denotes the desired (or alternatively, predetermined) threshold value.

In operation 440, the image rectification apparatus may adjust a weight of the second cost function. The image rectification apparatus may adjust the weight based on a result of the comparison performed in operation 430. For example, the image rectification apparatus may adjust the weight of the second cost function when the distortion degree of the converted image is greater than or equal to the desired (or alternatively, predetermined) threshold value. In an example, the image rectification apparatus may adjust the weights of the first distortion component through the fourth distortion component to correspond to "0.25."

In operation 450, the image rectification apparatus may determine the parameters based on the first cost function and the second cost function. The image rectification apparatus may determine the parameters using Equation 2.

In operation 460, the image rectification apparatus may compare a value of the total cost function based on $\varphi_n$ to a value of the total cost function based on $\varphi_{n-1}$. The value of the total cost function $\varphi_n$ based on may be calculated as a sum of the first cost function and the second cost function based on $\varphi_n$, and the value of the total cost function based on $\varphi_{n-1}$ may be calculated as a sum of the first cost function and the second cost function based on $\varphi_{n-1}$.

When the value of the total cost function based on $\varphi_n$ is less than the value of the total cost function based on the image rectification apparatus may determine that the values of the parameters are closer to an optimal value and iteratively perform operations 420 through 450. When operation 420 is performed after operation 460, $\varphi_{n+1}$ may be applied as a parameter. $\varphi_{n+1}$ may be determined from operation 450.

When the sum value of the total cost function based on $\varphi_n$ is greater than the value of the total cost function based on the image rectification apparatus may determine that the values of the parameters are distant from the optimal value and perform operation 470. In operation 470, the image rectification apparatus may output $\varphi_{n-1}$. The image rectification apparatus may determine the fundamental matrix F based on $\varphi_{n-1}$.

Repeated descriptions will be omitted for increased clarity and conciseness because the descriptions provided with reference to FIGS. 1 through 3 are also applicable to FIG. 4.

Figure 5:
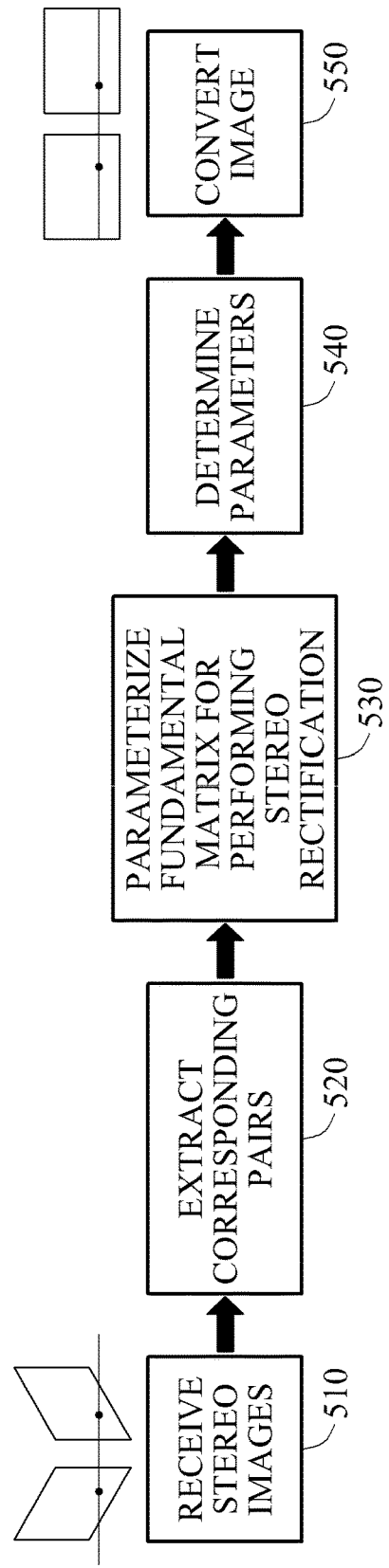
FIG. 5 illustrates an example of an image conversion process through image rectification according to at least one example embodiment.

FIG. 5 illustrates an example of an image conversion process through image rectification according to at least one example embodiment.

In operation 510, an image rectification apparatus (e.g., image rectification apparatus 100) may receive stereo images. In operation 520, the image rectification apparatus may extract corresponding pairs from the stereo images. For example, the image rectification apparatus 100 may further include an extractor (not shown). The extractor may extract corresponding pairs from the plurality of the images 131 and 132. The extractor may extract feature points from the plurality of the images 131 and 132 and extract the corresponding pairs by matching the feature points of the image 131 to the feature points of the image 132. In an example, the extractor may extract feature points based on a scale invariant feature transform (SIFT) method and match the feature points based on a random sample consensus (RANSAC) method. The extractor may transmit information associated with the extracted corresponding pairs to the determiner 120.

In operation 530, the image rectification apparatus may parameterize the fundamental matrix F for performing stereo rectification. In operation 540, the image rectification apparatus may determine the parameters of the fundamental matrix F. The image rectification apparatus may determine the parameters of the fundamental matrix F based on a cost function. In operation 550, the image rectification apparatus may convert an image. The converted image may be used by the determiner 120 to determine the fundamental matrix F according to the operations of FIG. 4.

Repeated descriptions will be omitted for increased clarity and conciseness because the descriptions provided with reference to FIGS. 1 through 4 are also applicable to FIG. 5.

Figure 6:
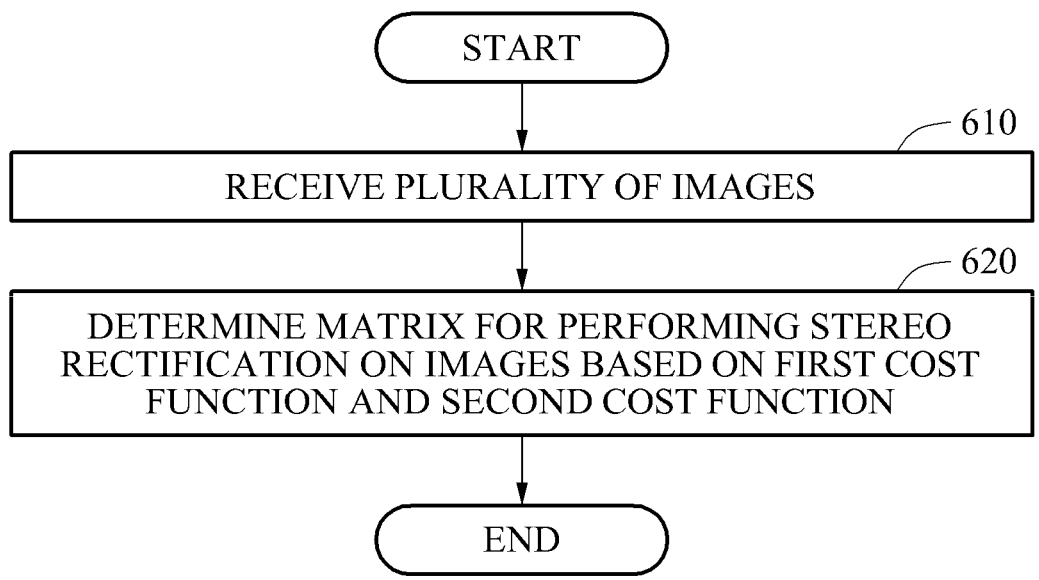
FIG. 6 illustrates an example of an image rectification method according to at least one example embodiment.

FIG. 6 illustrates an example of an image rectification method according to at least one example embodiment.

In operation 610, an image rectification apparatus (e.g., image rectification apparatus 100) may receive a plurality of images. In operation 620, the image rectification apparatus may determine a matrix for performing stereo rectification on images based on a first cost function and a second cost function. Repeated descriptions will be omitted for increased clarity and conciseness because the descriptions provided with reference to FIGS. 1 through 5 are also applicable to FIG. 6.

Figure 7A:
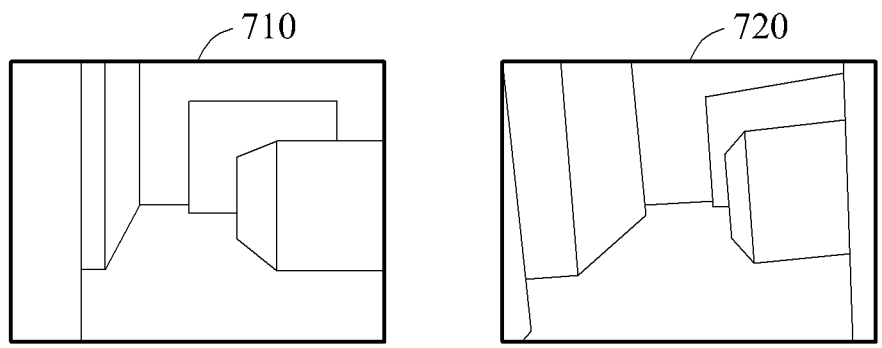
FIGS. 7A through 7C illustrate examples of pre-rectified images and rectified images according to at least one example embodiment.
Figure 7B:
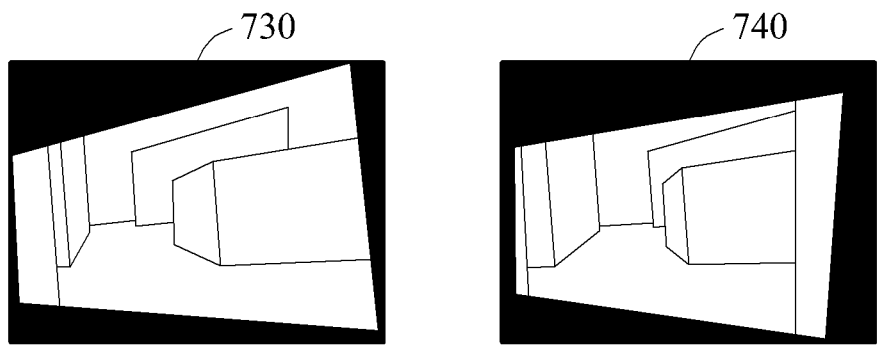
Figure 7C:
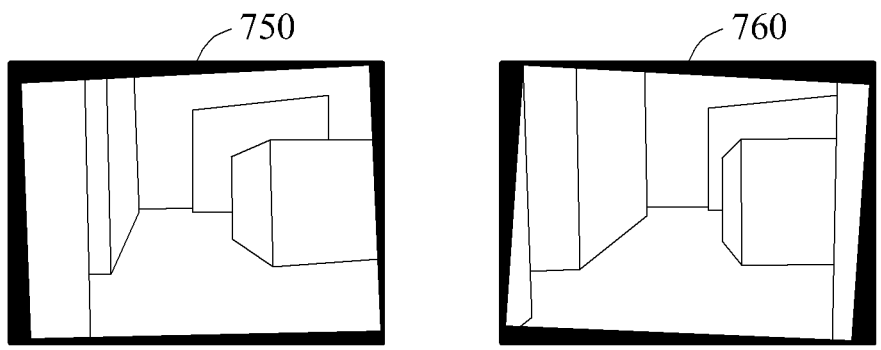

FIGS. 7A through 7C illustrate examples of pre-rectified images and rectified images according to at least one example embodiment.

Pre-rectified images 710 and 720 are illustrated in FIG. 7A, images 730 and 740 rectified based on a first cost function are illustrated in FIG. 7B, and images 750 and 760 rectified based on the first cost function and a second cost function are illustrated in FIG. 7C. Based on a comparison of FIGS. 7B and 7C, a reduction of distortions in the images 730 and 740 may be noted when compared to the images 750 and 760. Accordingly, at least one example embodiment may provide technology for reducing (or alternatively, minimizing) a distortion generated in a rectification process of an image.

Figure 8:
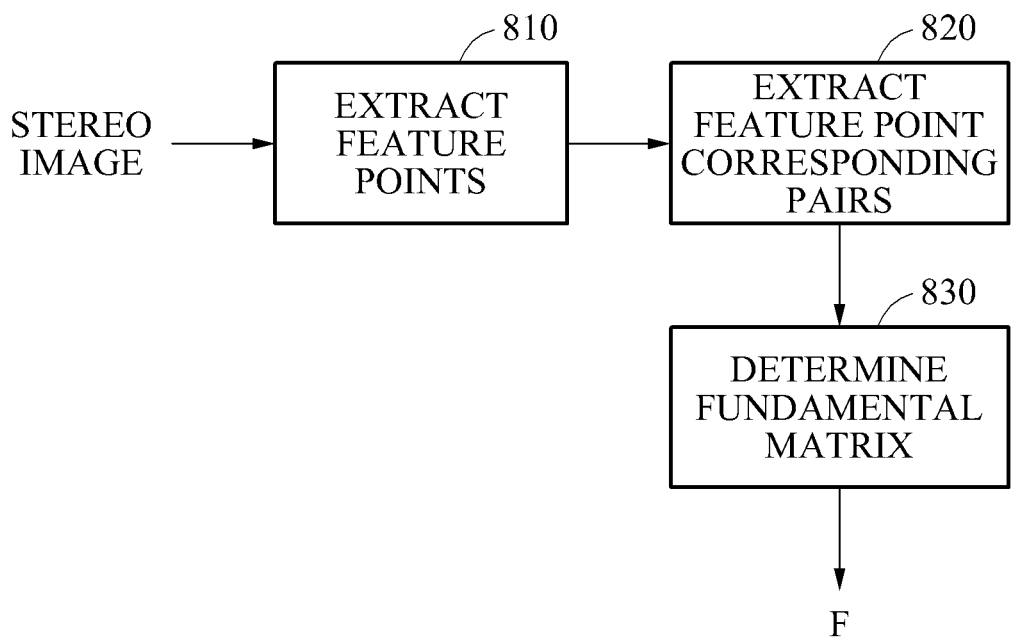
FIG. 8 illustrates a method of determining a fundamental matrix according to at least one example embodiment.

FIG. 8 illustrates a method of determining a fundamental matrix according to at least one example embodiment. Referring to FIG. 8, a processor (e.g., processor 1110 in FIG. 11) receives a stereo image and extracts feature points included in the stereo image in operation 810. The processor extracts first feature points from a left image and extracts second feature points from a right image. For example, the processor may extract a feature point based on a scale-invariant feature transform (SIFT) scheme. The processor may extract the feature points based on various known feature point extracting schemes.

In operation 820, the processor extracts feature point corresponding pairs based on the feature points extracted in operation 810. The processor may extract the feature point corresponding pairs between the left image and the right image by matching the first feature points to the second feature points. For example, the processor may match the feature points based on various matching schemes (e.g., a random sample consensus (RANSAC) scheme).

In operation 830, the processor determines the fundamental matrix F based on the feature point corresponding pairs. Repeated descriptions will be omitted for increased clarity and conciseness because the descriptions provided with reference to FIGS. 1A through 7C are also applicable to operation 830.

Figure 9:
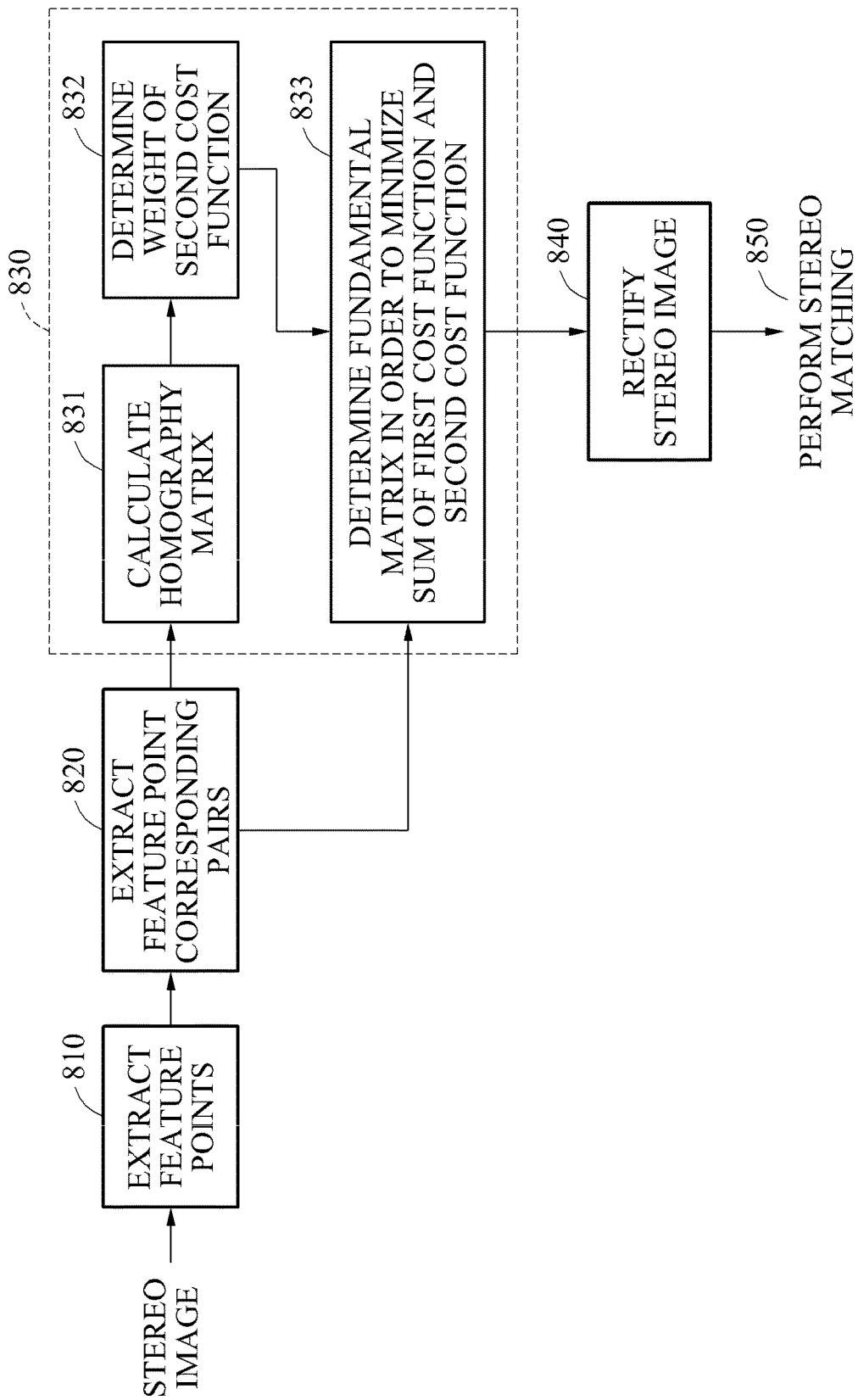
FIG. 9 illustrates a method of adaptively determining a weight of a second cost function according to at least one example embodiment.

FIG. 9 illustrates a method of adaptively determining a weight of a second cost function according to at least one example embodiment. Referring to FIG. 9, a processor (e.g., processor 1110 in FIG. 11) calculates a homography matrix among stereo images in operation 831.

Figure 10A:
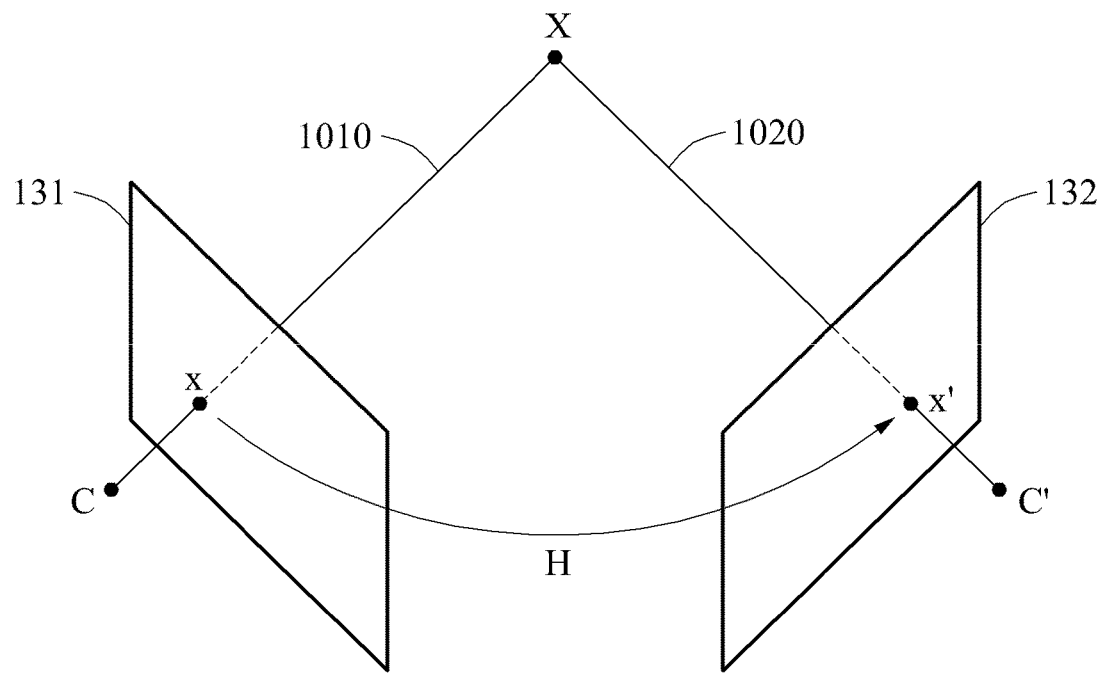
FIGS. 10A and 10B illustrate examples of a homography matrix according to at least one example embodiment.

Referring to FIG. 10A, the homography matrix refers to a matrix to convert a first beam 1010 to a second beam 1020 at a point X. The first beam 1010 is a path of light projected from the point X in a 3D space to a camera center C of a first viewpoint, and a second beam 1020 is a path of light projected from the point X to a camera center C' of a second viewpoint. Alternatively, the homography matrix may refer to a matrix to convert the point x included in the image 131 to the point x' included in the image 132.

The point x and the point x' may be one corresponding pair of extracted feature point corresponding pairs. Although not illustrated, the processor may determine other feature point corresponding pairs other than the point x and the point x'. The processor may calculate the homography matrix based on a desired (or alternatively, predetermined) number of feature point corresponding pairs.

Referring back to FIG. 9, in operation 832, the processor determines a weight of the second cost function based on the homography matrix. The second cost function may include a plurality of distortion components. The processor may set weights of the distortion components included in the second cost function based on the homography matrix.

Figure 10B:
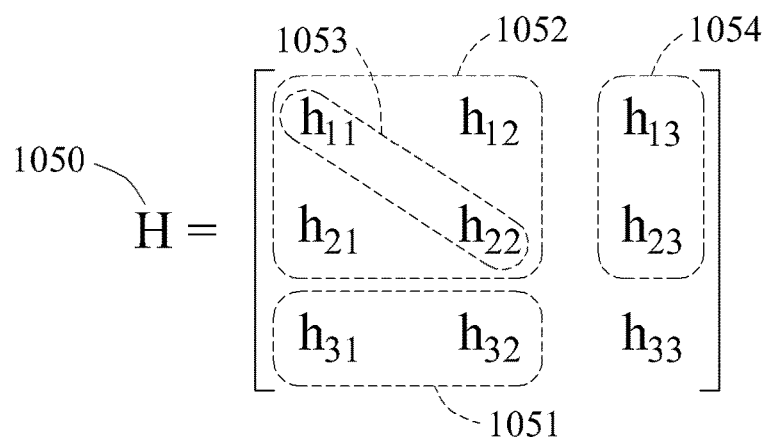

Referring to FIG. 10B, a homography matrix 1050 may be a 3×3 matrix. The homography matrix 1050 may include a skewness component 1051, a rotation component 1052, a scale component 1053, and a movement component 1054.

The processor may determine a weight of a distortion component indicating a skewness included in the second cost function based on the skewness distortion 1051. The distortion component indicating the skewness included in the second cost function may include a first distortion component indicating an aspect ratio of a converted image and a second distortion component indicating a skewness of the converted image. For example, the processor may determine $\rho_{AR}$ and $\rho_{SK}$ in Equation 20.

Also, the processor may determine a weight of a distortion component indicating a rotation included in the second cost function. The distortion component indicating the rotation included in the second cost function may include a third distortion component indicating a rotation of a converted image in comparison to an original image. For example, the processor may determine $\rho_R$ in Equation 20.

Also, the processor may determine a weight of a distortion component indicating a scale included in the second cost function based on the scale component 1053. The distortion component indicating the scale included in the second cost function may include a fourth distortion component indicating a size ratio of a converted image in comparison to an original image. For example, the processor may determine $\rho_{SR}$ in Equation 20.

Referring back to FIG. 9, in operation 833, the processor determines the fundamental matrix F. The processor determines the fundamental matrix F in order to minimize a sum of the first cost function and the second cost function. In such an example, the processor may perform weight summing on the first cost function and the second cost function based on the weight of the second cost function determined in operation 832. In operation 840, the processor rectifies stereo image. In operation 850, the processor performs stereo matching.

Figure 11:
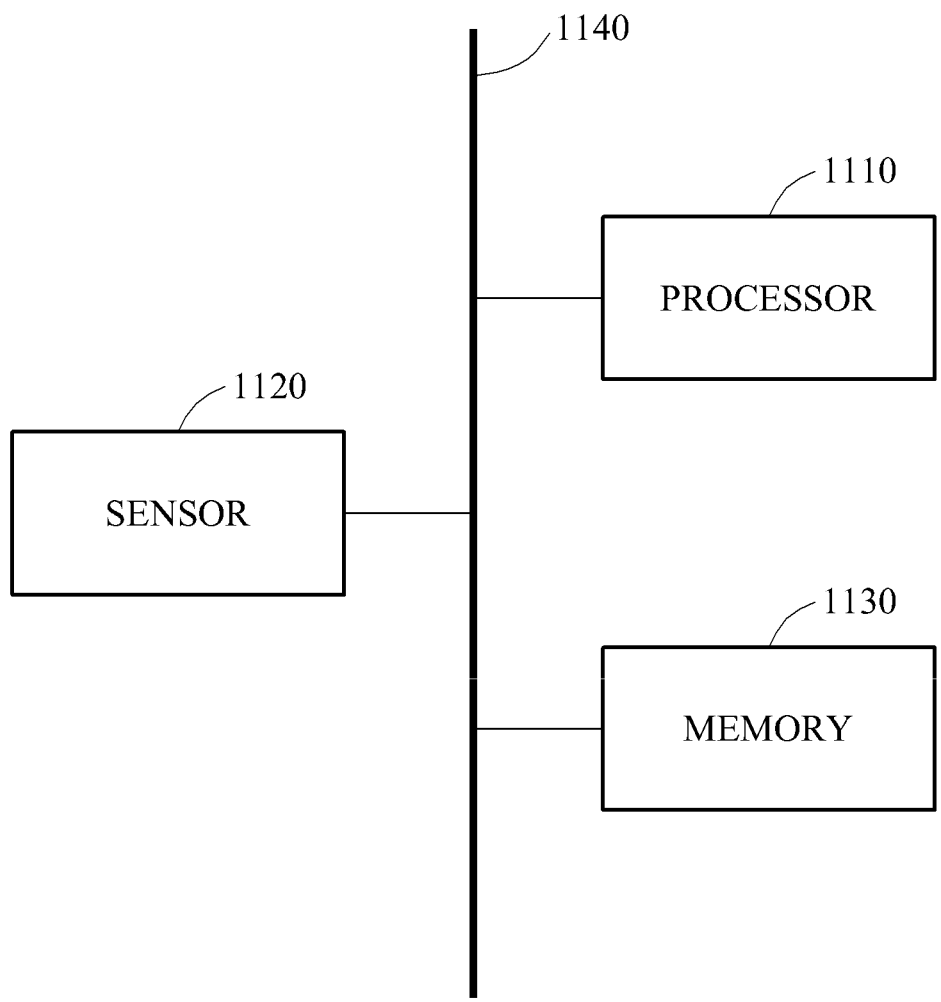
FIG. 11 illustrates an example of an electronic system according to at least one example embodiment.

FIG. 11 illustrates an example of an electronic system according to at least one example embodiment. Referring to FIG. 11, the electronic system includes a sensor 1120, a processor 1110, and a memory 1130. The sensor 1120, the processor 1110, and the memory 1130 communicate to each other through a bus 1140.

The sensor 1120 may be the stereo cameras 210 and 220 illustrated in FIG. 2A. The sensor 1120 may capture a stereo image based on a known method, for example, a method of converting an optical image to an electric signal. An image may be output to the processor 1110.

The processor 1110 may be a special purpose processor that implements the aforementioned elements in FIGS. 1A through 10B, or perform at least one of the aforementioned methods in FIGS. 1A through 10B. The memory 1130 may store the stereo image captured by the sensor 1120, the feature points extracted by the processor 1110, corresponding pairs of points, and/or a fundamental matrix calculated by the processor 1110. The memory 1130 may be a volatile memory or a non-volatile memory. It should be understood that the elements of FIG. 11 may be implemented as part of the same device or separate devices. For example, the processor 1110 and the memory 1130 may be implemented as a system on chip (SoC) and the sensor 1120 may be implemented as separate cameras 210 and 220 from FIG. 2A.

The processor 1110 may perform a program and control an electronic system. A program code (or computer readable instructions) executed by the processor 1110 may be stored in the memory 1130. The electronic system is connected to an external apparatus, for example, a personal computer (PC) or a network, through an input and output apparatus (not shown) and exchange data.

The electronic system may be implemented by a mobile device, such as a cellular phone, a smartphone, a personal digital assistant (PDA), a tablet computer, and a laptop computer, a computing device, such as a PC, a tablet computer, and a netbook, or electronic systems, such as a TV, a smart TV, and a security apparatus for gate control.

The units and/or modules described herein may be implemented using hardware components and software components. For example, the hardware components may include microphones, amplifiers, band-pass filters, audio to digital converters, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. An image rectification method, the method comprising:
receiving a plurality of images;
determining a matrix for performing rectification on the plurality of images based on a first cost function and a second cost function, the first cost function being associated with a distance of a corresponding pair of points from among the plurality of images, the second cost function being associated with distortion in a converted image;

converting the plurality of images based on the matrix to generate the converted image; and performing stereo matching based on the converted image.

2. The method of claim 1, wherein the second cost function comprises at least one of:
  a first distortion component indicating an aspect ratio of the converted image;
  a second distortion component indicating a skewness of the converted image;
  a third distortion component indicating a rotation of the converted image in comparison to an original image; and
  a fourth distortion component indicating a size ratio of the converted image in comparison to an original image.

3. The method of claim 1, wherein the first cost function comprises a sum of Sampson distances of the corresponding pairs of points.

4. The method of claim 1, wherein the determining comprises determining values of parameters in the matrix in order to minimize a sum of the first cost function and the second cost function.

5. The method of claim 4, wherein the parameters comprise a first focal length of a first camera photographing a first image from among the plurality of images, a second focal length of a second camera photographing a second image from among the plurality of images, a first separation distance of the first camera, a second separation distance of the second camera, first rotation angles of the first camera, and second rotation angles of the second camera.

6. The method of claim 1, wherein the matrix comprises:
  a first conversion matrix to convert a first image from among the plurality of images; and
  a second conversion matrix to convert a second image from among the plurality of images.

7. The method of claim 6, wherein each of the first conversion matrix and the second conversion matrix comprises:
  a first camera matrix associated with a focal point of a camera photographing a corresponding image from among the first image and the second image;
  a second camera matrix associated with a separation of the camera photographing the corresponding image; and
  a third camera matrix associated with a rotation of the camera photographing the corresponding image.

8. The method of claim 1, further comprising:
  extracting feature points from the plurality of images; and
  extracting the corresponding pairs of points by matching the feature points.

9. The method of claim 1, further comprising:
  calculating a homography matrix from among the plurality of images based on the corresponding pairs of points; and
  determining a weight of the second cost function based on the homography matrix.

10. The method of claim 9, wherein the determining of the weight comprises at least one of,
  determining a weight of a distortion component indicating a skewness in the second cost function based on a skewness component of the homography matrix;
  determining the weight of the distortion component indicating a rotation in the second cost function based on a rotation component of the homography matrix; and
  determining the weight of the distortion component indicating a scale in the second cost function based on a scale component of the homography matrix.

11. The method of claim 1, wherein the plurality of images comprises a stereo image.

12. A non-transitory computer-readable storage medium including an executable computer program to cause a computer to perform the method of claim 1.

13. An image rectification apparatus, the apparatus comprising:
  memory storing computer-executable instructions; and
  a processor configured to execute the computer-executable instructions such that the processor is configured to,
    receive a plurality of images,
    determine a matrix for performing rectification on the plurality of images based on a first cost function and a second cost function, the first cost function being associated with a distance of a corresponding pair of points from among the plurality of images, the second cost function being associated with distortion in a converted image,
    convert the plurality of images based on the matrix to generate the converted image, and
    perform stereo matching based on the converted image.

14. The apparatus of claim 13, wherein the second cost function comprises at least one of:
  a first distortion component indicating an aspect ratio of the converted image;
  a second distortion component indicating a skewness of the converted image;
  a third distortion component indicating a rotation of the converted image in comparison to an original image; and
  a fourth distortion component indicating a size ratio of the converted image in comparison to an original image.

15. The apparatus of claim 13, wherein the first cost function comprises a sum of a Sampson distance of the corresponding pairs of points.

16. The apparatus of claim 13, wherein the processor is configured to execute the computer-executable instructions such that the processor is configured to determine values of parameters in the matrix in order to minimize a sum of the first cost function and the second cost function.

17. The apparatus of claim 16, wherein the parameters comprise a first focal length of a first camera photographing a first image among the plurality of images, a second focal length of a second camera photographing a second image among the plurality of images, a first separation distance of the first camera, a second separation distance of the second camera, first rotation angles of the first camera, and second rotation angles of the second camera.

18. The apparatus of claim 13, wherein the matrix comprises:
  a first conversion matrix to convert a first image from among the plurality of images; and
  a second conversion matrix to convert a second image from among the plurality of images.

19. The apparatus of claim 18, wherein each of the first conversion matrix and the second conversion matrix comprises:
  a first camera matrix associated with a focal point of a camera photographing a corresponding image from among the first image and the second image;

a second camera matrix associated with a separation of the camera photographing the corresponding image; and a third camera matrix associated with a rotation of the camera photographing the corresponding image.

20. The apparatus of claim 13, wherein the processor is configured to execute the computer-executable instructions such that the processor is further configured to extract feature points from the plurality of images and the corresponding pairs of points by matching the feature points from among the plurality of images.

21. The apparatus of claim 13, wherein the processor is configured to execute the computer-executable instructions such that the processor is further configured to calculate a homography matrix from among the plurality of images based on the corresponding pairs of points and determine a weight of the second cost function based on the homography matrix.

22. A non-transitory computer-readable storage medium storing computer-executable code that, when executed by one or more processors causes the one or more processors to perform image processing operations including:

obtaining at least one stereo image;

extracting feature points from the at least one stereo image;

extracting at least one corresponding pair of points by matching feature points of a left image of the at least one stereo image and feature points of a right image of the at least one stereo image;

determining a fundamental matrix of the at least one stereo image based on a first cost function and a second cost function, the first cost function being associated with a distance of the at least one corresponding pair of points, the second cost function being associated with distortion in a converted image;

converting the stereo image based on the matrix to generate the converted image; and performing stereo matching based on the converted image.

23. The non-transitory computer-readable storage medium of claim 22, wherein the image processing operations further include:

calculating a homography matrix from among the at least one stereo image based on the at least one corresponding pair of points; and determining a weight of at least one distortion component in the second cost function based on the homography matrix.

24. The non-transitory computer-readable storage medium of claim 23, wherein the determining of the weight comprises at least one of:

determining the weight of the at least one distortion component indicating a skewness in the second cost function based on a skewness component of the homography matrix;

determining the weight of the at least one distortion component indicating a rotation in the second cost function based on a rotation component of the homography matrix; and determining the weight of the at least one distortion component indicating a scale in the second cost function based on a scale component of the homography matrix.

25. The non-transitory computer-readable storage medium of claim 24, wherein the at least one distortion component indicating the skewness comprises at least one of:

a first distortion component indicating an aspect ratio of the converted image; and a second distortion component indicating a skewness of the converted image.

26. The non-transitory computer-readable storage medium of claim 24, wherein the at least one distortion component indicating the rotation comprises, a third distortion component indicating a rotation of the converted image in comparison to an original image.

27. The non-transitory computer-readable storage medium of claim 24, wherein the at least one distortion component indicating the scale comprises, a fourth distortion component indicating a size of the converted image in comparison to an original image.

* * * * *